United States Patent [19]
Brodsky et al.

[11] Patent Number: 5,983,016
[45] Date of Patent: Nov. 9, 1999

[54] EXECUTION ENGINE IN AN OBJECT MODELING TOOL

[75] Inventors: Stephen Andrew Brodsky, Los Gatos; Gary Charles Doney, Sunnyvale, both of Calif.; Dipayan Gangopadhyay, Yorktown Heights, N.Y.; Michael Morris Golding, Palo Alto, Calif.; Subrata Mitra, San Jose, Calif.; Rajendra Bhagwatisingh Panwar, San Jose, Calif.

[73] Assignee: International Business Machines Corporation, Armonk, N.Y.

[21] Appl. No.: 08/747,058

[22] Filed: Nov. 12, 1996

[51] Int. Cl.$^6$ ...................................................... G06F 9/45
[52] U.S. Cl. ........................... 395/701; 395/702; 395/704
[58] Field of Search ..................................... 395/707, 705, 395/701, 704, 702, 703; 707/103

[56] References Cited

U.S. PATENT DOCUMENTS

| | | | |
|---|---|---|---|
| 4,845,665 | 7/1989 | Heath et al. | 345/333 |
| 5,247,651 | 9/1993 | Clarisse | 395/500 |
| 5,257,363 | 10/1993 | Shapiro et al. | 395/500 |
| 5,315,709 | 5/1994 | Alston, Jr. et al. | 707/6 |
| 5,325,533 | 6/1994 | McInerney et al. | 395/701 |
| 5,339,433 | 8/1994 | Frid-Nielsen | 395/705 |
| 5,390,320 | 2/1995 | Smithline | 395/500 |
| 5,390,330 | 2/1995 | Talati | 395/703 |
| 5,421,015 | 5/1995 | Khoyi et al. | 395/677 |
| 5,437,037 | 7/1995 | Furuichi | 395/700 |
| 5,485,600 | 1/1996 | Joseph et al. | 395/500 |
| 5,491,821 | 2/1996 | Kilis | 395/707 |
| 5,515,497 | 5/1996 | Itri et al. | 345/340 |
| 5,528,503 | 6/1996 | Moore et al. | 364/468.01 |
| 5,537,630 | 7/1996 | Berry et al. | 345/326 |
| 5,542,040 | 7/1996 | Chang et al. | 345/326 |
| 5,555,365 | 9/1996 | Selby et al. | 345/335 |
| 5,557,518 | 9/1996 | Rosen | 380/24 |
| 5,590,330 | 12/1996 | Coskun et al. | 395/704 |
| 5,608,908 | 3/1997 | Barghouti et al. | 395/703 |
| 5,652,884 | 7/1997 | Palevich | 707/100 |
| 5,699,310 | 12/1997 | Garloff et al. | 395/701 |
| 5,774,725 | 6/1998 | Yadav et al. | 395/704 |
| 5,790,117 | 8/1998 | Halviatti et al. | 345/333 |
| 5,790,863 | 8/1998 | Simonyi | 395/707 |
| 5,794,043 | 8/1998 | Kolb | 395/704 |
| 5,799,193 | 8/1998 | Sherman et al. | 395/703 |

OTHER PUBLICATIONS

Citrin, Wayne, et al., "Using Formalized Temporal Message–flow Diagrams," *Software—Practice and Experience*, vol. 25, No. 12, pp. 1367–1401, Dec. 1995.

Coats, Mark, et al., "Constructing Operational Specifications," *Dr. Dobb's Journal of Software Tools for Professional Programmer*, vol. 20, No. 6, pp. 18–33, Jun. 1995.

De Man, Josef, et al., "Towards a formal Semantics of Message Sequence Charts", *SDL '93 Using Objects. Proceedings of the Sixth SDL Forum 1993*, pp. 157–165, 1993.

De Man, Jozef, et al., "Developing Formal Specifications with Message Sequence Charts", *XIV International Switching Symposium*, vol. 2, pp. 134–137, Oct. 1992.

Ek, Anders, "Verifying Message Sequence Charts with the SDT Validator," *SDL '93. Using Objects. Proceedings of the Sixth SDL Forum 1993*, pp. 237–249.

*Primary Examiner*—Robert W. Downs
*Assistant Examiner*—Brian Sattizahn
*Attorney, Agent, or Firm*—Gates & Cooper

[57] ABSTRACT

A method, apparatus, and article of manufacture for modeling object-oriented systems includes an object modeling tool that defines methods and event transitions in an object-oriented system and generates an executable program that exhibits the behavior of the object-oriented system and interfaces with the object-oriented system. The object modeling tool further translates the event transitions to an execution language, wraps methods written in the target language, wraps event transitions corresponding to an event, and gathers one or more wrapped events and methods into an executable program.

30 Claims, 13 Drawing Sheets

OTHER PUBLICATIONS

Grabowski, Jens, et al.,"The Standardization of Message Sequence Charts," *Proceedings 1993: Software Engineering Standards Symposium,* pp. 48–63, 1993.

Graubmann, Peter, et al., "Towards a Petri Net Based Semantics Definition for Message Sequence Charts,"*SDL 93: Using Objects,* pp. 179–190, 1993.

Hadzilacos, Thanasis, et al., "Transaction Synchronisation in Object Bases", *Journal of Computer and System Sciences,* vol. 43, pp. 2–24, 1991.

Ito, Atsushi, et al., "Transformation Technique Between Specification in SDL and Specification in Message Sequence Charts for Designing Protocol Specifications," *Supercomm/ICC '92: Discovering a New World of Communications,* IEEE vol. 1, pp. 0442–0447, 1992.

Ladkin, Peter B., et al., "What do Message Sequence Charts Mean?", *IFIP Trans., C, Commun. Syst.,* vol. C, No. 22, pp. 301–316, 1994.

Ladkin, Peter B., et al., "Interpreting Message Flow Graphs," *Formal Aspects of Computing 1995,* vol. 7, No. 5, pp. 473–509, 1995.

Mauw, S., et al., "An Algebraic Semantics of Basic Message Sequence Charts," *The Computer Journal,* vol. 37, No. 4, pp. 269–277, 1994.

Mauw, S., et al., "A Formal Semantics of Synchronous Interworkings," *SDL '93 Using Objects: Proceedings of the Sixth SDL Forum 1993,* pp. 167–178.

Moriyasu, Kenji, et al., "A Method of Applying Message Sequence Chart Specifications for Services with Variant Process Structure," *Electronics and Communications in Japan,* Part 1, vol. 78, No. 9, pp. 12–24, 1995.

Okamoto, Mitsuhiro, et al., "A Verification Scheme for Service Specifications Described by Information Sequence Charts," *IEICE Trans. Commun.,* vol. E75–B, No. 10, pp. 978–985, Oct. 1992.

Thrampoulidis, K.X., et al., "Object Interaction Diagram: A New Technique in Object–oriented Analysis and Design," *Journal of Object–Oriented Programming,* vol. 8, No. 3, pp. 25–32, Jun. 1995.

"Transition Control Statements for State Models"; IBM Technical Disclosure Bulletin; vol. 38, No. 11, pp. 387–389, Nov. 1995.

"Event Data Management in an Object Oriented System"; IBM Technical Disclosure Bulletin; vol. 38, No. 11, pp. 431–435, Nov. 1995.

The VIEWS Method and Tool, IBM Technical Disclosure Bulletin, vol. 37, No. 12, pp. 645–647, Dec. 1994.

EXECUTION ENGINE IN AN OBJECT MODELING TOOL

CROSS-REFERENCE TO RELATED APPLICATIONS

This application is related to the following co-pending and commonly-assigned patent applications:

application Ser. No. 08/747,415 entitled "METHOD FOR SYNCHRONIZING CLASS, METHODS, ATTRIBUTES AND OBJECT PROPERTIES ACROSS AN OBJECT-ORIENTED SYSTEM," filed on same date herewith, by Stephen A. Brodsky, Timothy J. Grose and Roni Korenshtein, attorney's docket number ST9-96-030;

application Ser. No. 08/747,414 entitled "LAYOUT METHOD FOR ARC-DOMINATED LABELLED GRAPHS," filed on same date herewith, by Subrata Mitra and Dipayan Gangopadhyay, attorney's docket number ST9-96-035;

application Ser. No. 08/747,417 entitled "NOTIFICATION MANAGER FOR AN OBJECT-ORIENTED SYSTEM," filed on same date herewith, by Stephen A. Brodsky and Timothy J. Grose, attorney's docket number ST9-96-059;

application Ser. No. 08/747,057 entitled "INTERACTIVE MODELING AGENT FOR AN OBJECT-ORIENTED SYSTEM," filed on same date herewith, by Stephen A. Brodsky and Rebecca Mei-Har Lau, attorney's docket number ST9-96-060;

application Ser. No. 08/747,416 entitled "MULTI-OBJECT VIEWS IN AN OBJECT MODELING TOOL," filed on same date herewith, by Roni Korenshtein, attorney's docket number ST9-96-062;

all of which applications are incorporated by reference herein.

BACKGROUND OF THE INVENTION

1. Field of the Invention

This invention relates generally to object-oriented systems, and in particular to an object-oriented modeling tool.

2. Description of Related Art

Object modeling tools permit a developer to develop an object model and then execute the model to observe its behavior. In creating an executable model, developers are often forced to choose the programming language of the executable program early in the development process. If the programming language is chosen early, the advantages and disadvantages of that language tend to color many other choices. The developer might try, for example, to take advantage of features such as runtime functions, bindings, or multiple inheritance.

When the executable program is generated with current modeling tools, the entire object-oriented system is generated and included within the executable program. This means that each time the object-oriented system is modified, the entire object-oriented system may need to be regenerated.

There is a need in the art for an object modeling tool that allows the developer to create a model and later select the execution language. Further, there is a need in the art for an object modeling tool that permits the modular generation of an executable program.

SUMMARY OF THE INVENTION

To overcome the limitations in the prior art described above, and to overcome other limitations that will become apparent upon reading and understanding the present specification, the present invention discloses a method, apparatus, and article of manufacture for modeling object-oriented systems. The invention includes an object modeling tool that defines methods and event transitions in an object-oriented system and generates an executable program that exhibits the behavior of the object-oriented system and interfaces with the object-oriented system. The object modeling tool further translates the event transitions to an execution language, wraps methods written in the target language, wraps event transitions corresponding to an event, and gathers one or more wrapped events and methods into an executable program.

Various advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples in accordance with the invention.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

The present invention provides an object-oriented analysis and design tool for executing object-oriented systems created of real-world scenarios. Execution is carried out by inter-object message sending. The behavior associated with the messages is defined by the developer during the development of the object-oriented system. Once the developer has defined objects and their behavior in the object-oriented system, the system is executed so the developer can observe its behavior and then perform iterative refinement on the object-oriented system until it is complete. Underlying the executable modeling capability of the object modeling tool is an execution engine which records the user-specified behavior and assembles those pieces into a working program when the developer initiates execution of the object-oriented system.

Hardware Environment

Figure 1:
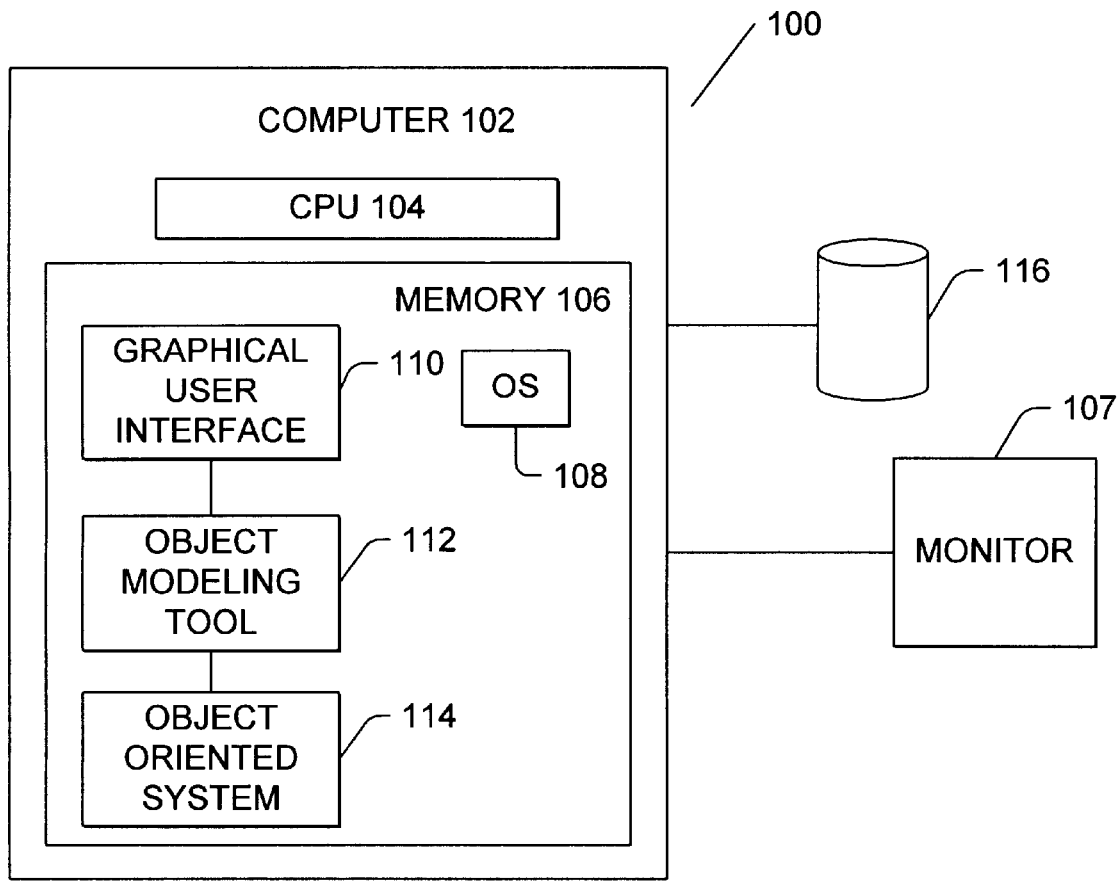
FIG. 1 illustrates an exemplary computer system that could be used to implement the present invention.

FIG. 1 illustrates an exemplary computer system 100 that could be used to implement the present invention. The computer 102 comprises a processor 104 and random access memory (RAM) 106. The computer 102 may be coupled to other devices, such as a monitor 107, a keyboard, a mouse device, a printer, etc. Of course, those skilled in the art will recognize that any combination of the above components, or any number of different components, peripherals, and other devices, may be used with the computer 102.

Generally, the computer 102 operates under control of an operating system 108 stored in the memory 106. The present invention is preferably implemented using one or more data structures and computer programs operating under the control of the operating system 108. More specifically, the present invention includes a graphical user interface 110, an object modeling tool 112, and an object-oriented system 114.

In the preferred embodiment, the operating system 108, graphical user interface 110, object modeling tool 112, and object-oriented system 114, are all tangibly embodied in a computer-readable medium, e.g., data storage device 116, which could include one or more fixed or removable data storage devices, such as a removable cartridge drive, floppy disc drive, hard drive, CD-ROM drive, tape drive, etc. Further, the operating system 108, graphical user interface 110, object modeling tool 112, and object-oriented system 114 are all comprised of instructions which, when read and executed by the computer 102, causes the computer 102 to perform the steps necessary to implement and/or use the present invention. Of course, those skilled in the art will recognize many modifications may be made to this configuration without departing from the scope of the present invention.

Figure 2:
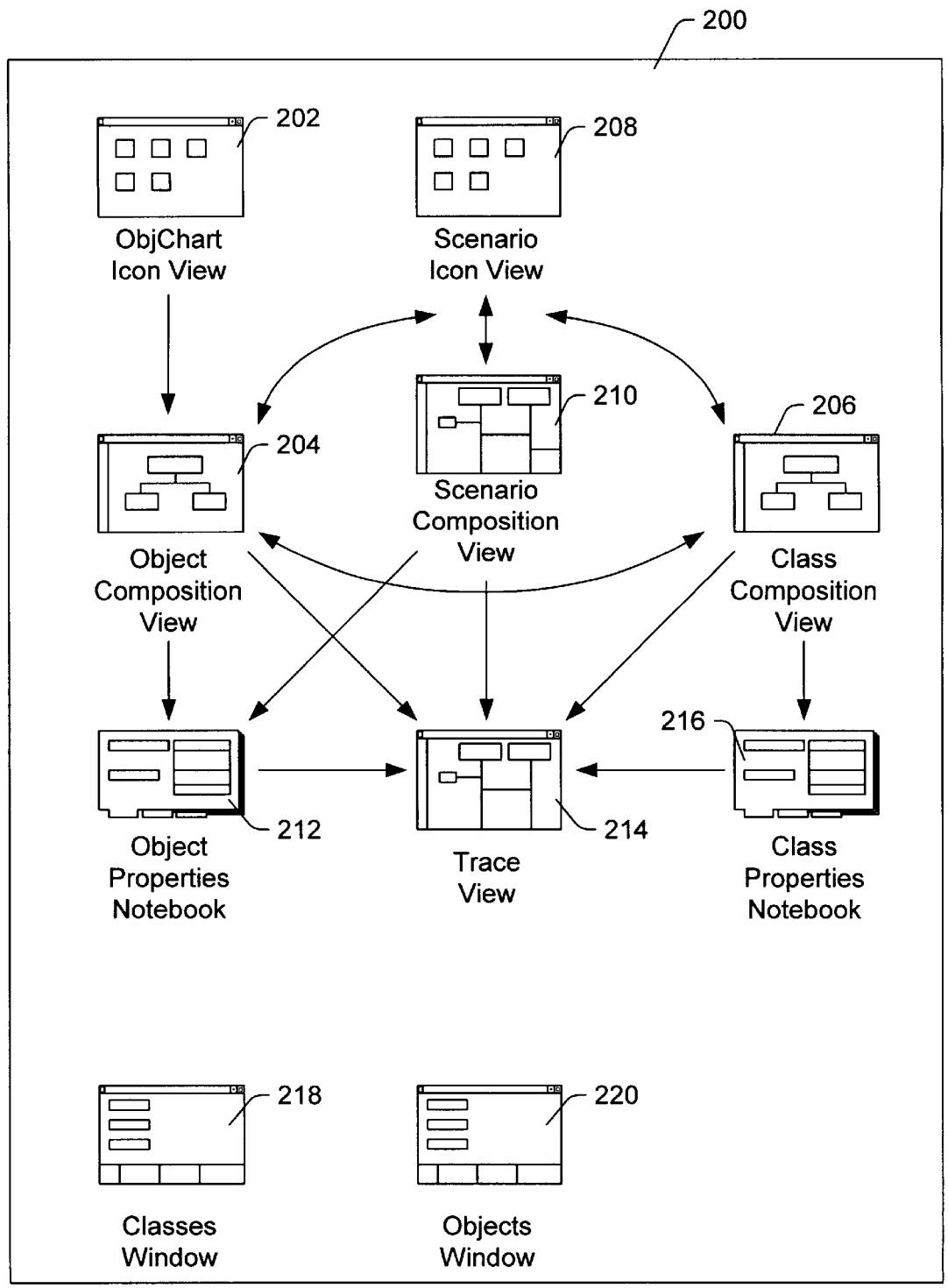
FIG. 2 shows a number of different windows or views in a graphical user interface displayed on a monitor of the computer by the object modeling tool of the present invention.

FIG. 2 shows a number of different windows or views in a graphical user interface (GUI) 110 displayed on a monitor 107 of the computer 102 by the object modeling tool 112 of the present invention, wherein these views are used to interact with the developer in the construction and execution of an object-oriented system 114 or its component parts. The GUI 110 of the system 200 includes a number of different views, including an ObjChart Icon View 202, an Object Composition View 204, a Class Composition View 206, a Scenario Icon View 208, a Scenario Composition View 210, an Object Properties Notebook 212, a Trace View 214, a Class Properties Notebook 216, a Class Window 218, and an Object Window 220.

Object-Oriented System

The object-oriented system 114 has classes, objects, and scenarios. A class defines the structure and behavior for an entity, called an instance or an object. The structure includes attributes, relationships, and states. An instance or object is an entity that takes its structure and behavior from its class. The structure and behavior is the data and procedures that are associated with a class or object. A scenario is a sequence of messages among objects.

The structure and behavior is defined by the properties and relationships of the class or object. Properties include, but are not limited to, attributes, operations, and states. Relationships include containment for classes and objects, associations, and inheritance for classes.

Because an object is an instance of a class, it has the same properties as its class. An object cannot exist without a class. An object can be created as an instance of an existing class or be created as an object and a new class. In order to run a model or investigate behavior through using scenarios, objects must be created or instantiated from classes. The object-oriented system 114 has structure, as shown in object diagrams and class diagrams, and behavior, as shown in scenario diagrams, state diagrams, methods, and event operations.

The object-oriented system 114 is executed by interactively submitting events and methods, with arguments, to selected objects. Depending on the behavior of the objects as defined by their events (with or without states) and methods, the object modeling tool 112 executes the object-oriented system 114 and shows messaging interactions among the objects, state transitions of the objects, and error messages, which pinpoint errors or undefined parts of the object model 114. The object modeling tool 112 runs the scenarios, state transitions, events, and methods defined in the object-oriented system 114.

Scenarios describe the messages that a group of objects exchanges within a particular context. In general, a sending object requests a receiving object to perform an action. In message passing, an operation in one object uses operations in another object. A scenario is a sequence of messages among objects, consisting of a stimulus to an object and cascading messages among the objects. A synch point represents the moment when the object receives a message and may send out resulting messages. Scenarios are particularly appropriate for modeling problems that involve interactions and timing, such as user interfaces and process control.

A state represents the configuration or disposition of a class or object at a specific point in time. A state for a class is potential, because only instances of the class exhibit behavior. An object can change to a different state when it receives a message. States for an object defined on the class identify when the object may respond to messages and when it will not. The from state is the optional state a class or object must be in to do the actions that are associated with a message. The to state is the optional state the class or object will be in as a result of meeting the conditions. These two states can be the same, and either or both can be omitted from an event definition. If states are defined for a class, one of them can be defined as the default state. When the class is instantiated, the default state of the class becomes the current state of the instance. The state of objects can be changed by calling an event that has transitions which cause state changes.

Events define the behavior of an object. In general, operations make classes (or objects) work together. An event specifies the actions caused when an object receives a message and the specified condition or conditions (if any exist) are met. One use of an event is to cause an object to change from one state to another. The event has one message and one or more transitions. A transition has one or more condition-action pairs. Each condition-action pair has zero or more conditions and zero or more actions. When an object receives a message corresponding to the event, all the conditions of all of the transitions are evaluated, and when exactly one condition is found to be true, its corresponding actions are executed.

A message is a signal that an object responds to through the set of transitions in an event or method. A message has a name and zero or more arguments. A condition is a valid comparison or query to an object or expression that resolves to true or false. Conditions include computations with attribute values. An action can be a message that an object sends to one or more objects. The actions can change one or more attribute values of the object and/or send messages to other objects or to itself.

Execution Engine

Figure 3:
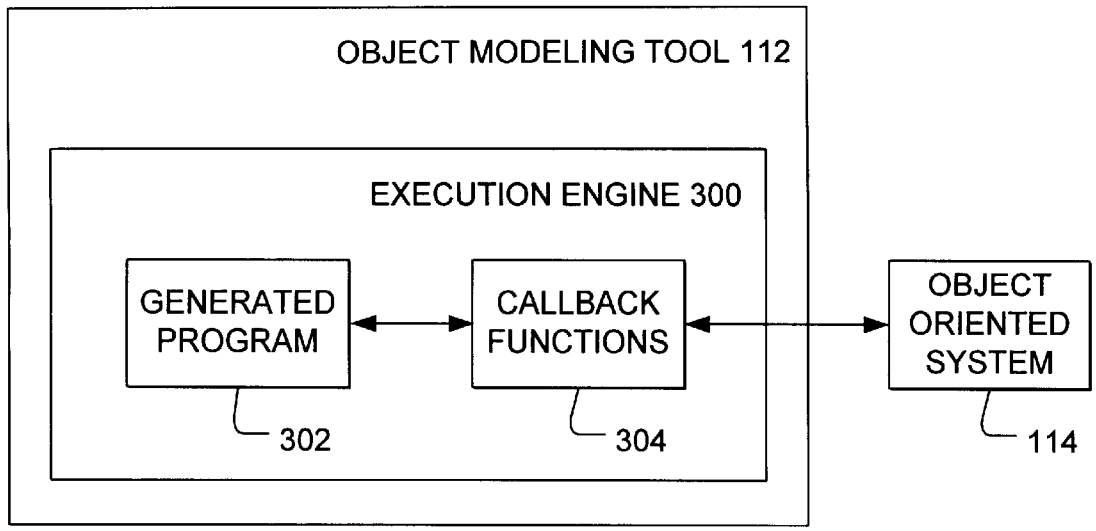
FIG. 3 is a block diagram illustrating the execution engine according to the present invention.

FIG. 3 is a block diagram illustrating the execution engine according to the present invention. The object modeling tool 112 includes an execution engine 300 that creates a generated application 302 and interfaces to the object-oriented system 114 through the callback routines 304. The generated program 302 is executed by the computer 102 at run-time to exhibit the behavior of the object-oriented system 114. The callback routines 304 are included in and used in each generated program 302 to retrieve information about the static objects in the object-oriented system 114 and to perform updates to the object-oriented system 114 or perform other tasks such as tracing.

Figure 4:
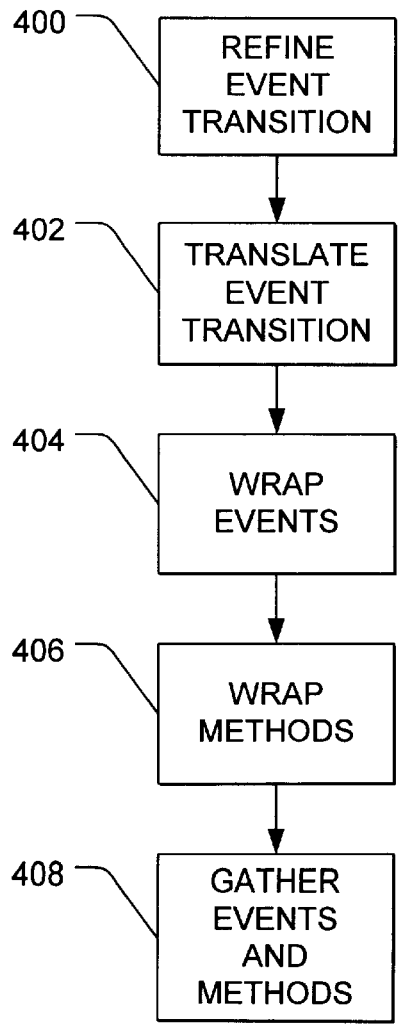
FIG. 4 is a block diagram illustrating the logic performed by the execution engine according to the present invention.

FIG. 4 is a block diagram illustrating the logic performed by the execution engine 300 in creating the generated program 304 according to the present invention.

Block 400 represents the execution engine 300 receiving the condition-action pairs from the graphical user interface 110.

Block 402 represents the execution engine 300 translating the condition-action pairs into the underlying execution language.

Block 404 represents the execution engine 300 wrapping conditions and actions corresponding to the same event into one or more subroutines.

Block 406 represents the execution engine 300 wrapping the methods into one or more subroutines.

Block 408 represents the execution engine 300 gathering one or more of the wrapped events and methods into the generated program 302.

The developer enters the conditions and actions for the event transitions in a modeling language. When the statements comprising the conditions and actions are submitted to the object-oriented system 114 through the graphical user interface 110, a translation of just the condition and action statements to the underlying execution language takes place.

In an exemplary embodiment according to the present invention, the execution language is LotusScript™ BASIC, but those skilled in the art will recognize that any third generation language could be used. The translated condition-action statements are stored in the object-oriented system 114. The developer continues to create event transitions (conditions/actions) until the object-oriented system 114 is ready to be executed.

Prior to execution, the translated condition-action statements, which have been stored in the object-oriented system 114 during the behavior-specification, are assembled into a working program. This assembly into a complete program occurs in a three-step process.

First, as described above, the condition and action statements that a developer enters are translated from the modeling language into the target language. Typically this is done when the developer submits the transition logic (conditions, actions, state changes) to the object-oriented system 114. This provides the code fragments needed by the next step, the wrapping step. If the system detects that the developer has not performed an explicit translation update, it will be done automatically before the next step. This translation step may be optional in that no translating may be necessary if the condition and action statements are provided to the execution engine 300 directly in the underlying execution language.

Second, all conditions and actions corresponding to the same event are collected and wrapped into one or more subroutines. Each subroutine encapsulates the collective condition-action transition pairs for a given event, the transition selection logic, and the state change logic. A transition can be thought of as 4-tuples consisting of a condition, from state, to state, and action. The generated subroutine contains the programming equivalent of the set of 4-tuples corresponding to a single event. Thus, an object receiving an event corresponds to the execution of one of the wrapped subroutines. The transition selection logic defines the relationship between multiple transitions, for example, an event operation is executed if exactly one of the conditions validates as true.

Third, one or more of the wrapped subroutines are gathered into the executable generated program 302. The generated program 302 includes all the wrapped subroutines, and also a top-level "send" function which performs the routing of messages to the appropriate subroutines during the run of the object-oriented system 114. Once the gathering is complete, the generated program 302 is ready to be executed by the computer 102.

During the course of creating the object-oriented system 114, the developer may wish to update, or add, or delete a transition to or from an existing event. Doing this marks the event for rewrapping. When the developer later executes the object-oriented system 114, all such marked events are wrapped again, and the gathering process is repeated as before. Events which have had no transition updates are not rewrapped, since the previously wrapped versions have been saved in the model and are still valid. Methods which have not changed are not re-wrapped.

Similarly, new classes, objects, and events (with corresponding condition/action/state transitions) can be added during the refinement of the object-oriented system 114. Each additional event will correspond to a subroutine which requires wrapping during the gather process. Again, events or methods which have had no updates will not be re-wrapped, since they will still be valid as saved in the object-oriented system 114. The preservation of the valid wrapped subroutines as well as the translated condition/action code fragments contributes to the efficiency of both the wrap and gather processes, since only those pieces which modify the completed program are generated.

The generated program 302 contains the logic for implementing the behavior of objects in the object-oriented system 114. The generated program 302 must interface with the static components of the object-oriented system 114 (classes, objects, events, methods, and attributes). To obviate the generation of code to both represent them and synchronize them with those in the static model, a set of callback routines 304 is provided. The callback routines 304 are implemented as either subroutines in the generated program 302 or as interfaces to methods written in other languages. These callback routines 304 are included in and used in the generated program 302 to retrieve information about the static model objects in the object-oriented system 114 and to perform updates to the object-oriented system 114.

The callback routines 304 include a Set function that creates and updates objects in the object-oriented system 114, a Get function that accesses objects from the object-oriented system 114, and a Trace function that allows for the interactive display by the graphical user interface 110 of the execution of the object-oriented system 114.

Figure 5:
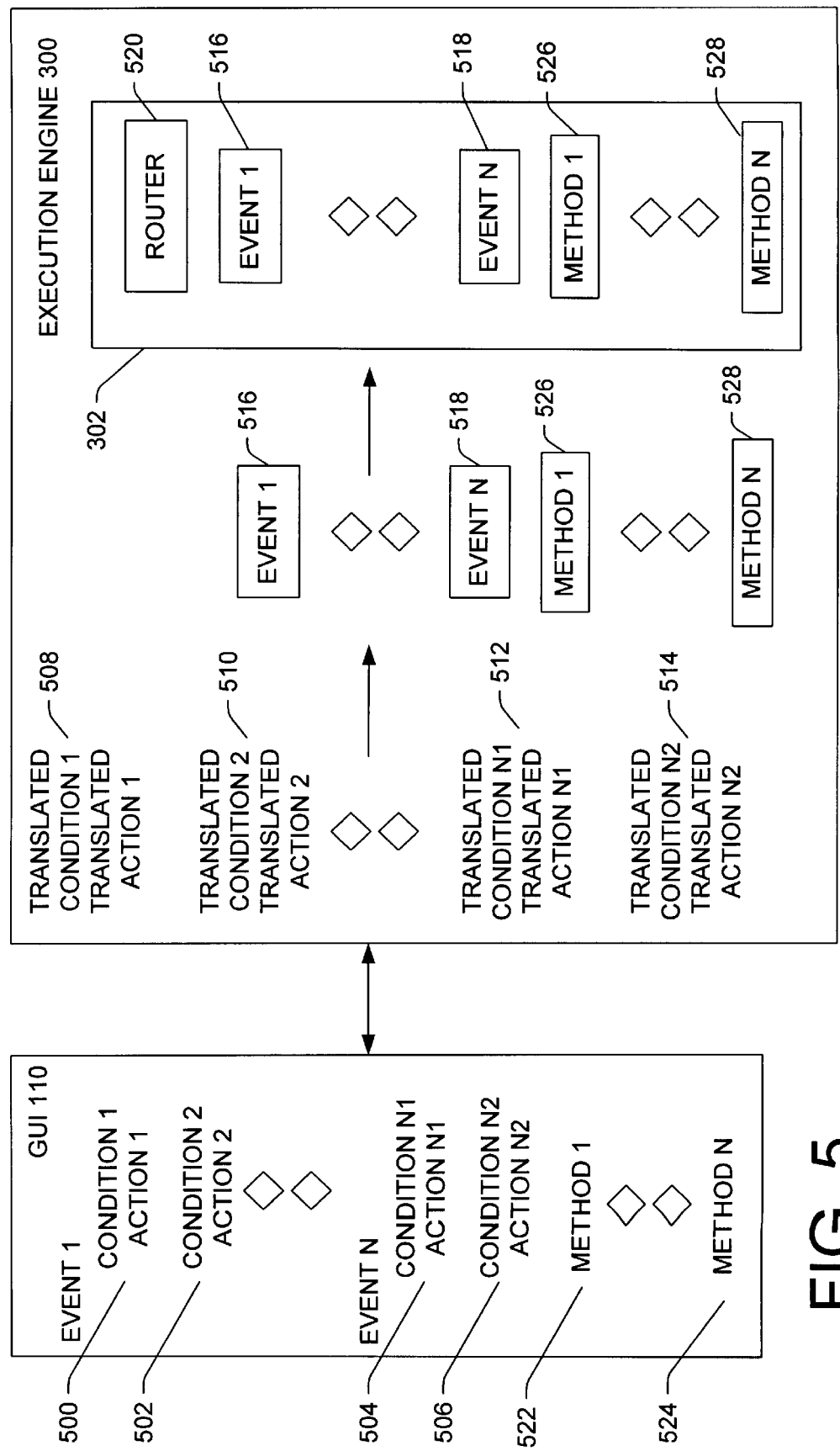
FIG. 5 is a block diagram further illustrating the logic performed by the execution engine according to the present invention.

FIG. 5 is a block diagram further illustrating the logic performed by the execution engine according to the present invention. The developer enters condition-action pairs 500 and 502 corresponding to Event 1 and condition-action pairs 504 and 506 corresponding to Event N through the graphical user interface (GUI) 110. The developer also enters instructions 522 and 524 corresponding to Method 1 and Method N through the graphical user interface (GUI) 110.

The execution engine 300 translates condition-action pairs 500, 502, 504, and 506 into translated condition-action pairs 508, 510, 512, and 514. The execution engine 300 also stores Method 1 522 and Method N 524 as Method 1 526 and Method N 528.

The execution engine 300 wraps the translated condition-action pairs 508 and 510 corresponding to Event 1 into subroutine 516. The execution engine 300 wraps the translated condition-action pairs 512 and 514 corresponding to Event N into subroutine 518. Method 1 526 and Method N 528 are also wrapped.

The wrapped subroutines 516 and 518 are gathered to form generated program 302, which also includes a router subroutine 520 for executing a top-level "send" function which performs the routing of messages to the appropriate subroutines during execution of the generated program 302.

Program Execution

During the execution of the generated program 302, when an object receives a message the computer 102 checks the message to see whether the object contains an operation with that name. If not, the graphical user interface 110 displays an error message on the monitor 107. The computer 102 checks the arguments to determine whether the number and types match the operation. If not, the graphical user interface 110 displays an error message on the monitor 107. After the computer 102 determines that the operation message is valid, the computer 102 finds out what state the object is in.

The computer 102 checks the conditions of the transitions. If one transition evaluates to true and the From state is the current state or there is no From state, then the actions of that transition will be executed. If the conditions of more than one transition evaluate to true, the graphical user interface 110 displays an error message on the monitor 107 and the run ends. If the computer 102 finds syntax errors in the transition, the graphical user interface 110 displays an error message on the monitor 107 and the run ends. If there are no matching conditions, the run ends. If a change of state is involved in the transition with true conditions, the computer 102 changes the object to the new state. The computer 102 then executes the action.

Figure 6A:
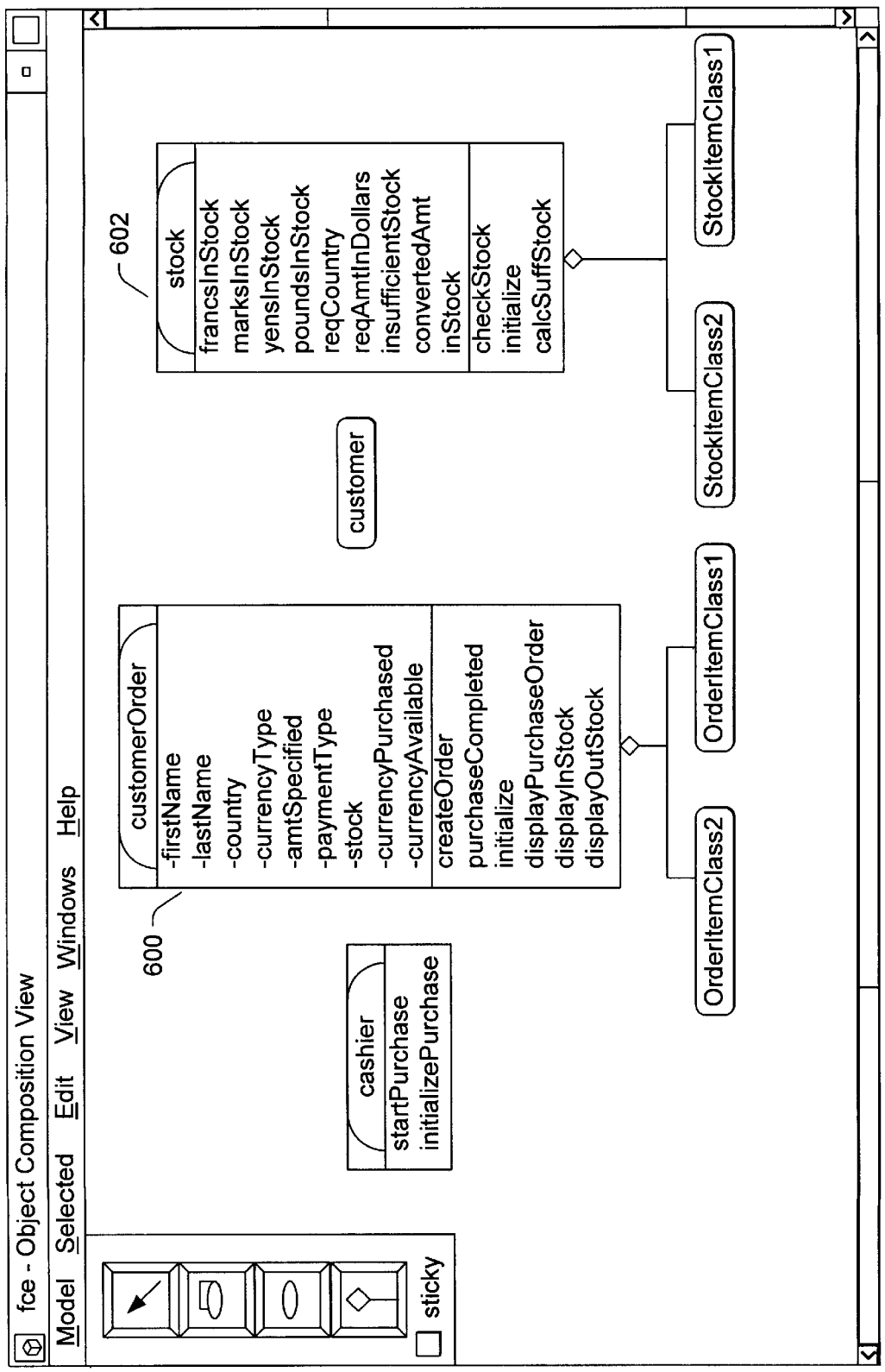
FIGS. 6A–6I are illustrations of a user interface that provide an example of the operation of the object modeling tool according to the present invention.

FIG. 6A–I are illustrations of a graphical user interface 110 according to the present invention. FIG. 6A illustrates the Object Composition View 204. The Object Composition View 204 is a view of the objects in the object-oriented system 114. Each Object is shown in some rudimentary form in the Object Composition View 204. FIG. 6A shows expanded views of the customerOrder object 600 and stock object 602.

Figure 6B:
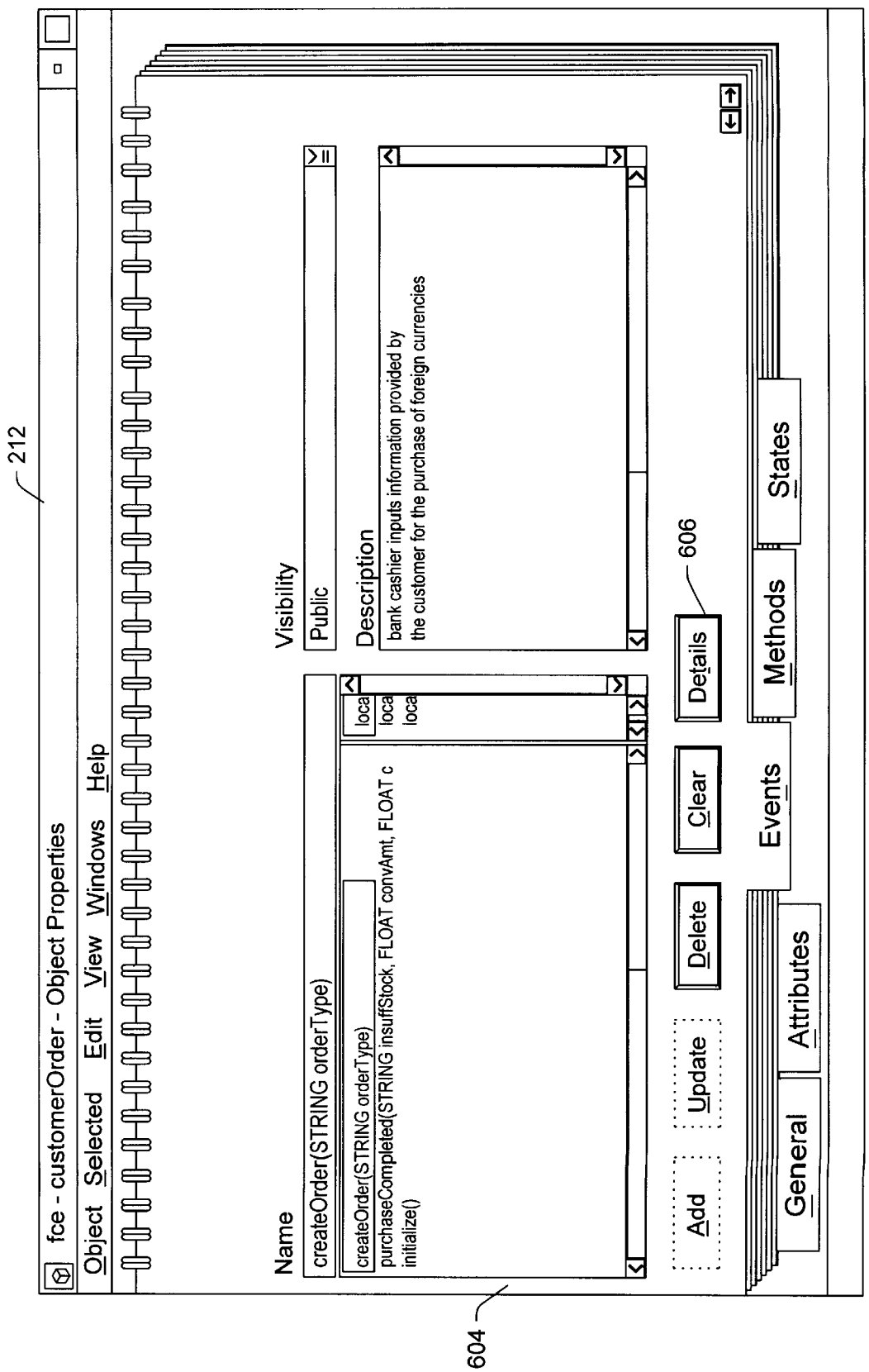
Figure 6C:
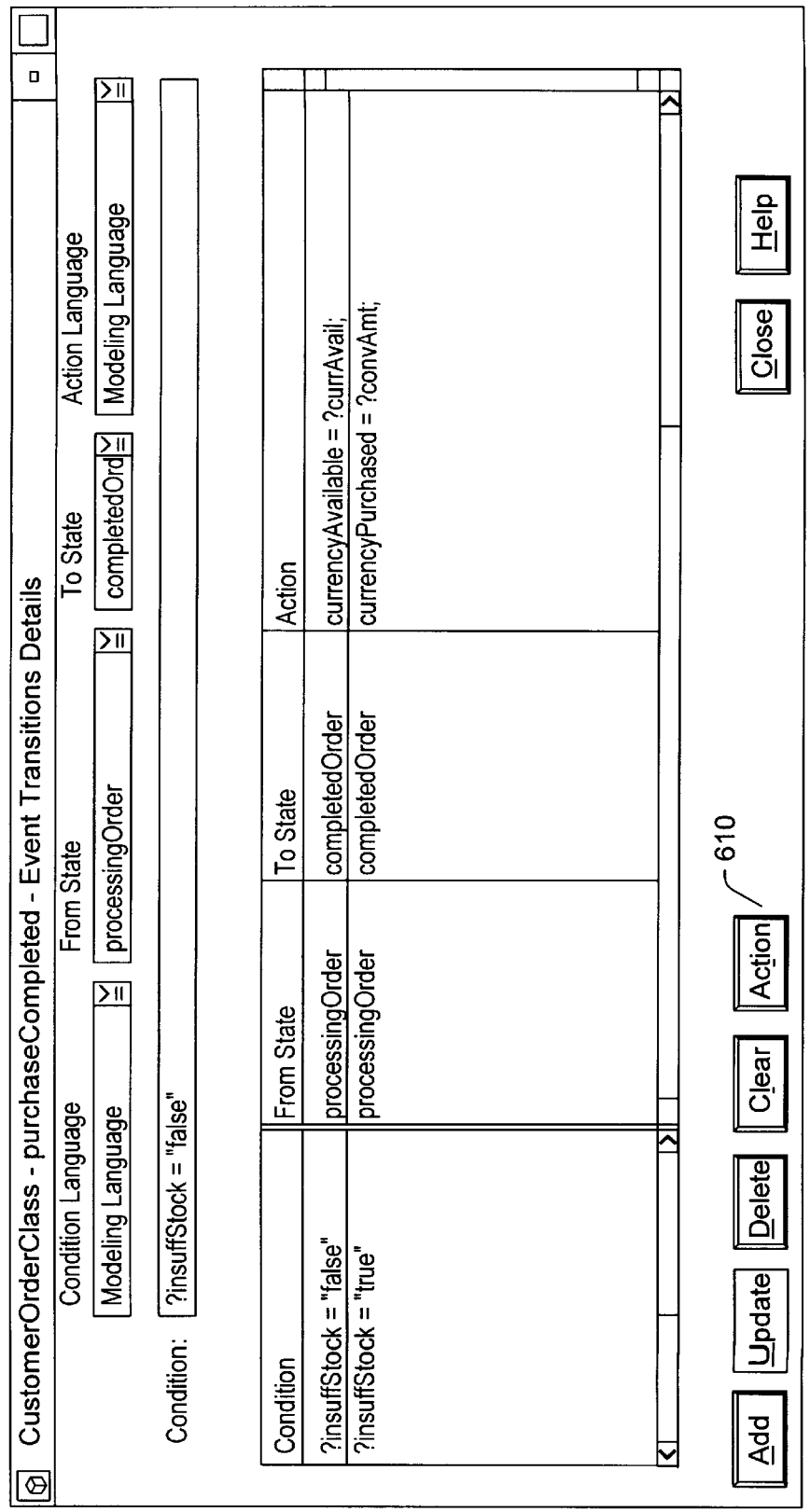
Figure 6D:
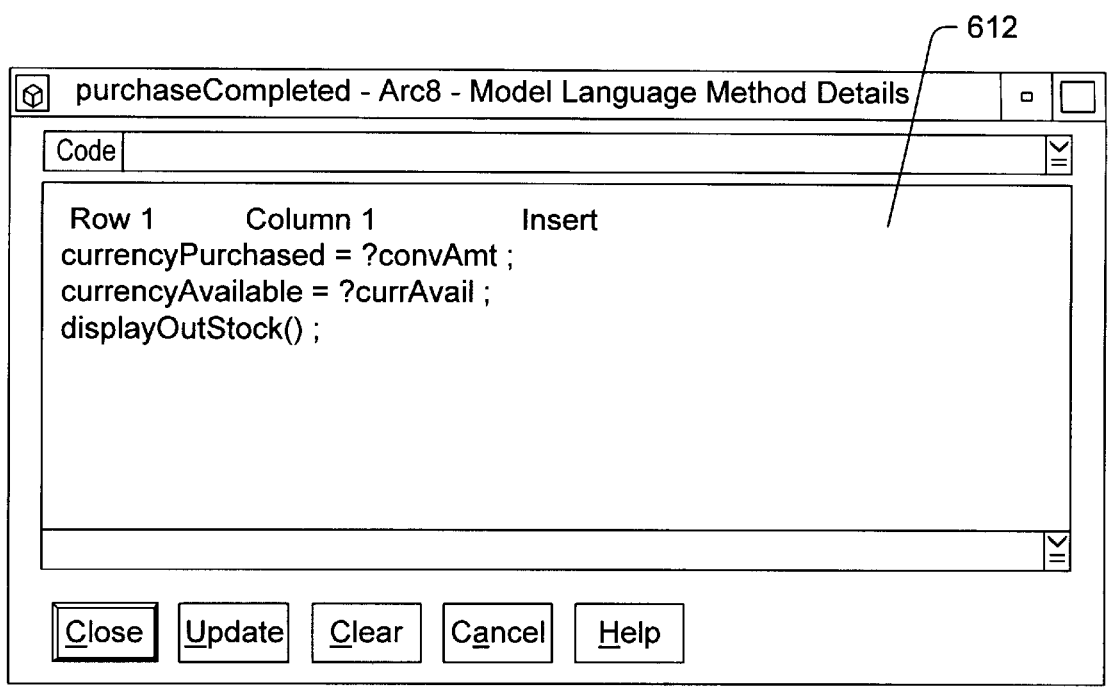

FIG. 6B illustrates a first example of the Object Properties Notebook 212 displaying the events window 604. (The corresponding methods window would appear and operate in a similar manner.) The events window 604 displays event transitions for customerOrder object 600. By selecting the details button 606 from the events window 604, FIG. 6C shows the event transitions details window 608 showing the event transitions, for the selected event, in this example the event purchaseCompleted. Selecting the action button 610 displays the expanded action window 612 of FIG. 6D for the event purchaseCompleted. The expanded action window 612 allows the developer to input the action for the selected event transition.

Figure 6E:
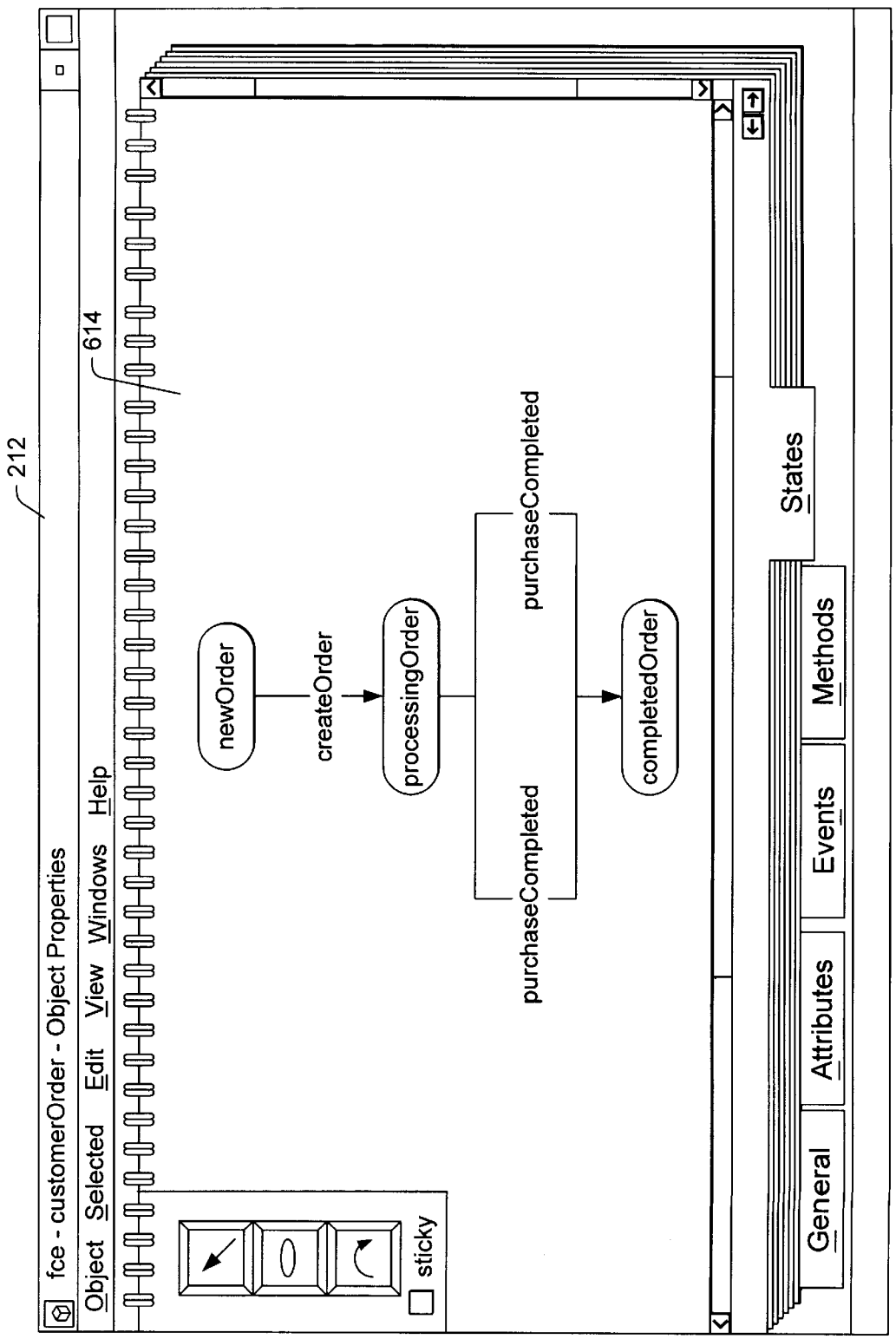

FIG. 6E illustrates the Object Properties Notebook 212 displaying the states window 614. The states window 614 shows the state transitions for the customerorder object 600.

Figure 6F:
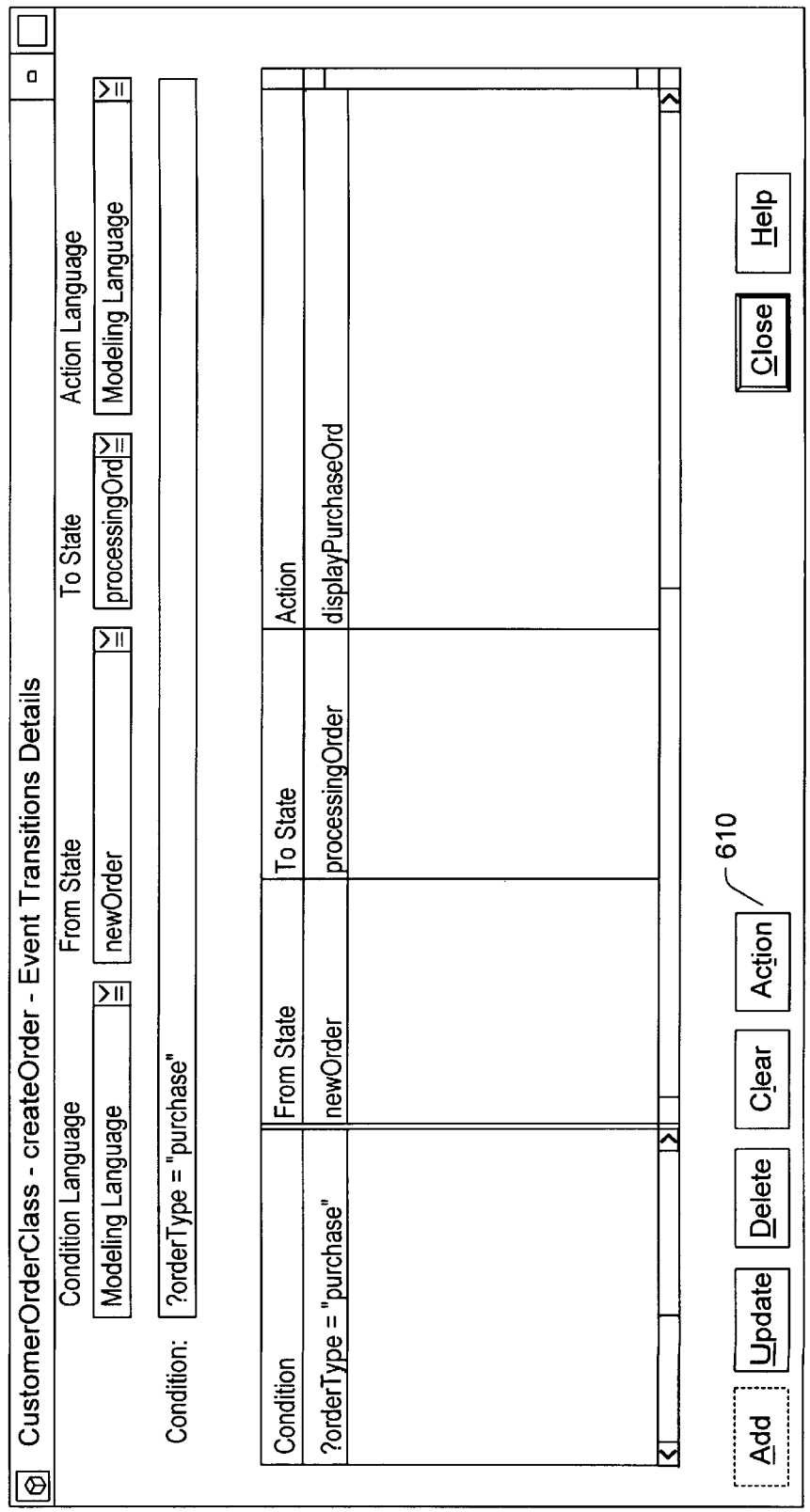
Figure 6G:
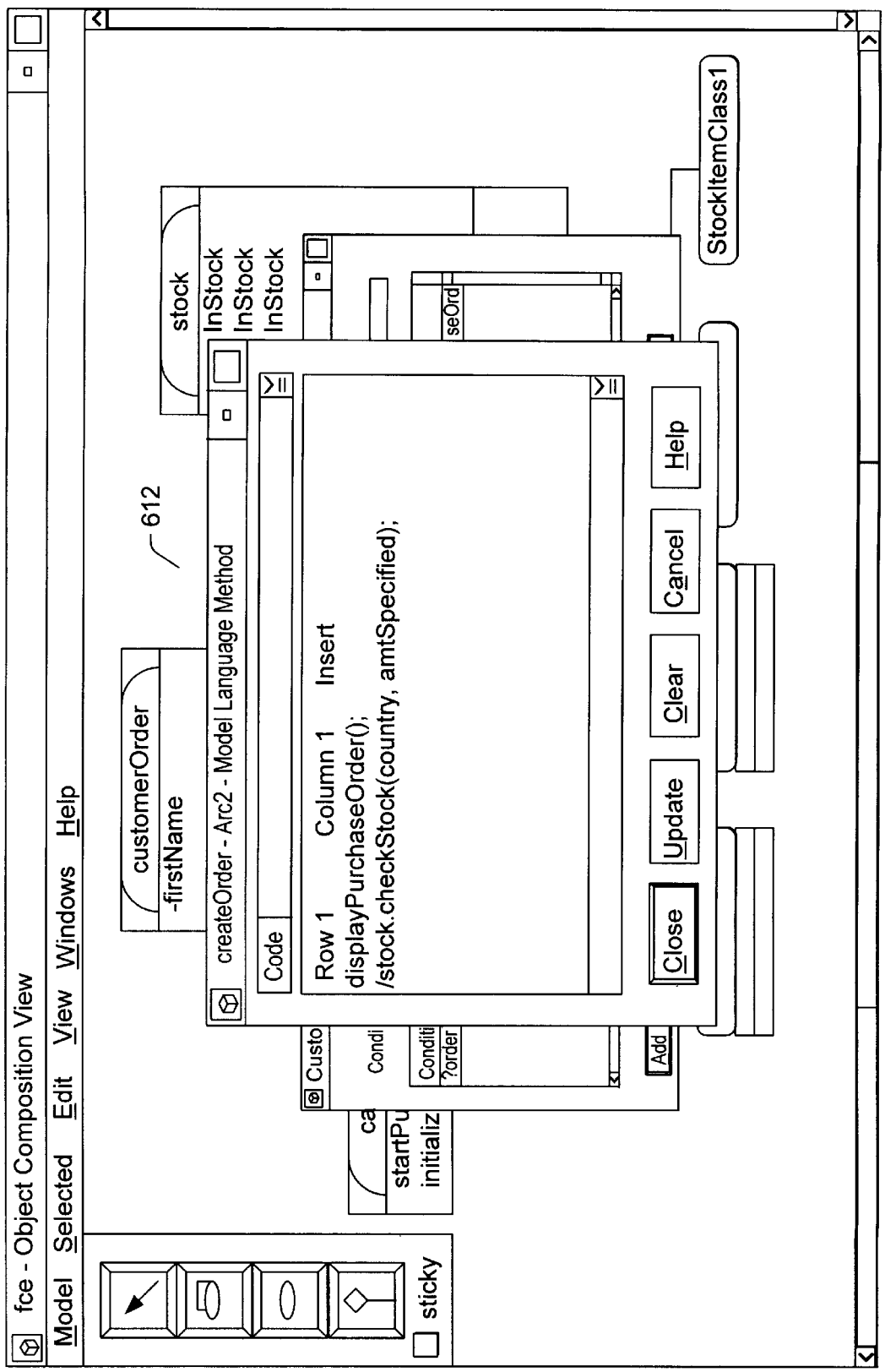

FIG. 6F and 6G illustrate a second example of the Object Properties Notebook 212 displaying the event transitions details window 608. Selecting the action button 610 in FIG. 6F displays the expanded action window 612 in FIG. 6G for the event createorder. The expanded action window 612 allows the developer to input the action for the selected event transition.

Figure 6H:
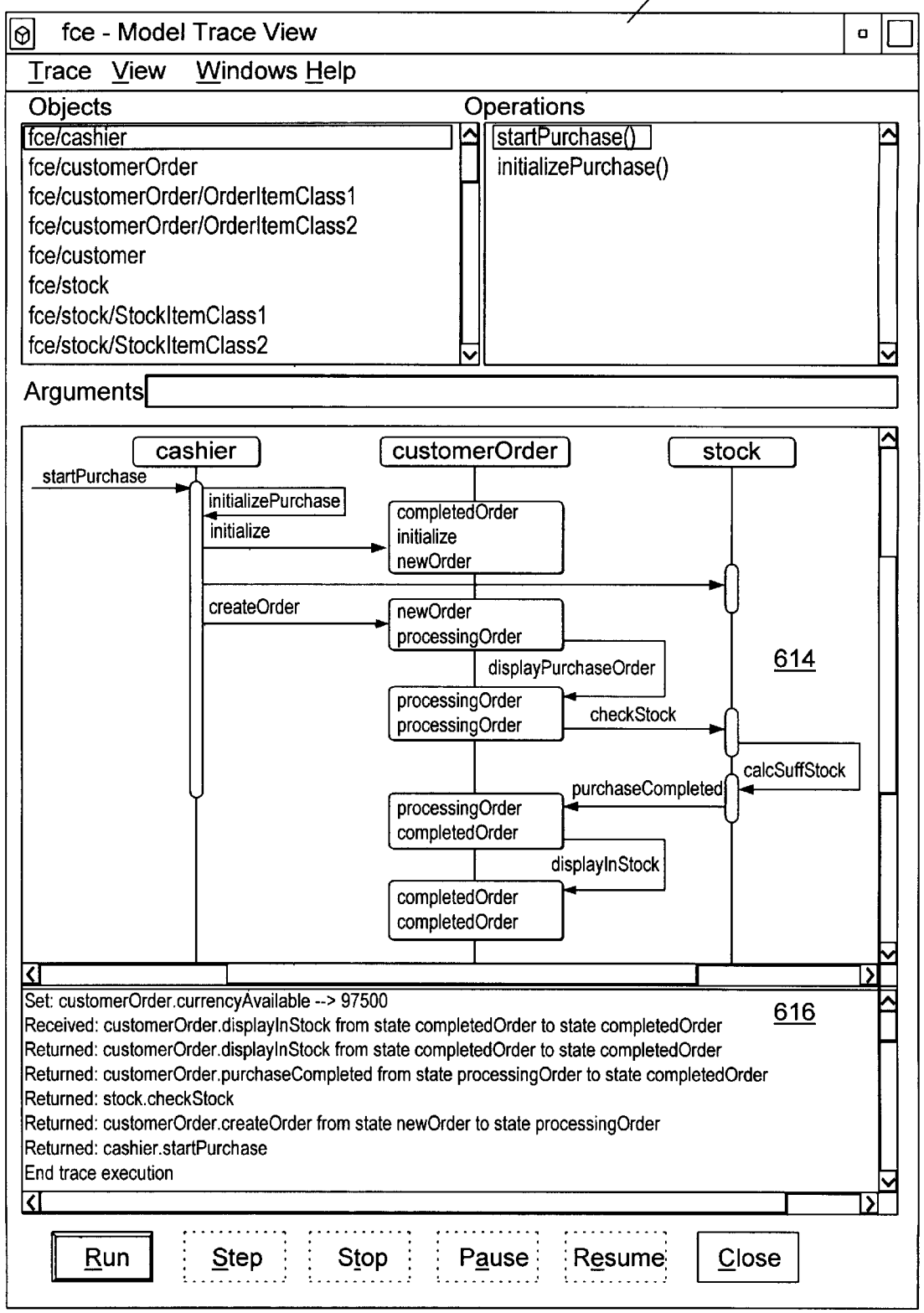
Figure 6I:
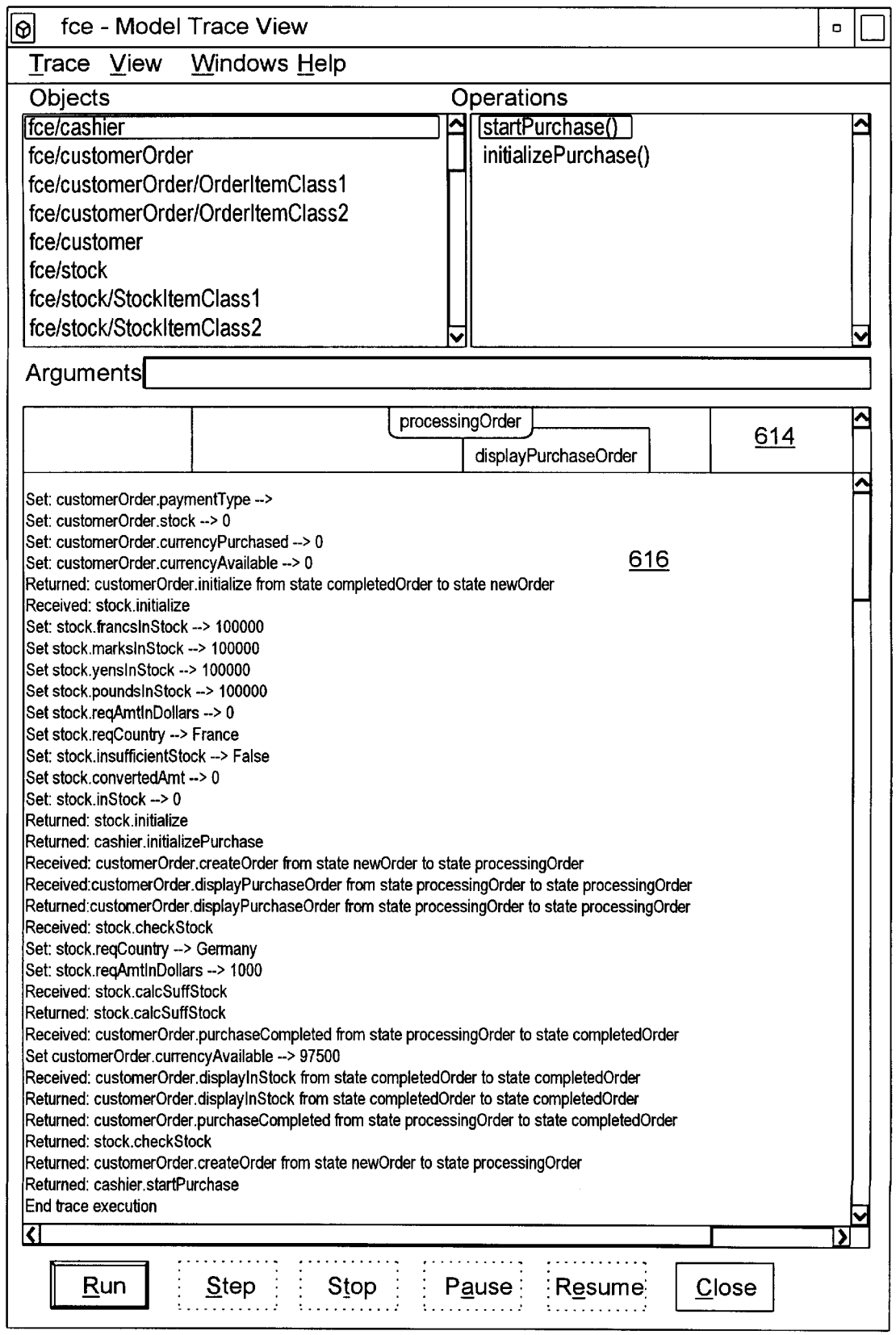

FIGS. 6H and 6I illustrate the Trace View 214. The Trace View 214 has a graphics pane 614 for graphically displaying the execution of the object-oriented system 114 and a text pane 616 for textually displaying the execution of the object-oriented system 114. Graphics pane 614 dynamically draws the object model execution as attributes are set, events and methods are executed, and objects enter and leave states, for example. Text pane 616 dynamically displays text describing the object-oriented system 114 execution.

Conclusion

This concludes the description of the preferred embodiment of the invention. The present invention discloses a method, apparatus, and article of manufacture for modeling object-oriented systems. The invention includes an object modeling tool that defines methods and event transitions in an object-oriented system and generates an executable program that exhibits the behavior of the object-oriented system and interfaces with the object-oriented system. The object modeling tool further translates the event transitions to an execution language, wraps methods written in the target language, wraps event transitions corresponding to an event, and gathers one or more wrapped events and methods into an executable program.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for modeling object-oriented systems, comprising the steps of:

defining an object-oriented system stored in a computer; and generating a program external to the obiect-oriented system for execution by a computer, wherein the program contains the logic for implementing the behavior of objects in the object-oriented system and interfaces with the object-oriented system through one or more callback routines for retrieving information about objects in the object-oriented system and for performing updates to the object-oriented system.

2. The method of claim 1, wherein the object-oriented system comprises objects, wherein the defining step further comprises the step of defining an event for an object, wherein the event comprises one or more transitions.

3. The method of claim 2, wherein the generating step further comprises the steps of:

translating the transitions to an execution language for execution by a computer;

wrapping the event, wherein the wrapped event comprises one or more translated transitions, transition selection logic, and state change logic corresponding to the event; and gathering one or more wrapped events into the program for execution by a computer.

4. The method of claim 3, further comprising the step of executing the program.

5. The method of claim 3, wherein the program comprises a send function for routing messages to the wrapped events.

6. The method of claim 2, wherein the defining step further comprises the step of modifying an event for an object, wherein the modified event comprises one or more modified transitions.

7. The method of claim 6, wherein the generating step further comprises the steps of:

translating the modified transitions to an execution language for execution by a computer;

wrapping the modified event, wherein the wrapped modified event comprises one or more translated transitions, transition selection logic, and state change logic corresponding to the modified event; and gathering one or more wrapped modified events into the program for execution by a computer.

8. The method of claim 2, wherein the transitions each comprise a condition and an action, wherein the action is executed when the condition is satisfied.

9. The method of claim 1, wherein the object-oriented system comprises objects, wherein the defining step further comprises the step of defining a method for an object, wherein the method comprises one or more instructions in a target programming language.

10. The method of claim 9, wherein the generating step further comprises the steps of:

wrapping the method, wherein the wrapped method comprises one or more routines corresponding to an event; and gathering one or more wrapped methods into the program for execution by a computer.

11. A computer-implemented object-oriented modeling tool, comprising:

a computer storing an object-oriented system comprised of objects; and object modeling tool means, performed by the computer, for defining the object-oriented system and for generating a program external to the object-oriented system for execution by the computer, wherein the program contains the logic for implementing the behavior of objects in the object-oriented system and interfaces with the object-oriented system through one or more callback routines for retrieving information about objects in the object-oriented system and for performing updates to the object-oriented system.

12. The apparatus of claim 11, wherein the defining means further comprises means for defining an event for an object, wherein the event comprises one or more transitions.

13. The apparatus of claim 12, wherein the generating means further comprises means for translating the transitions to an execution language for execution by a computer, for wrapping the event, wherein the wrapped event comprises one or more translated transitions, transition selection logic, and state change logic corresponding to the event, and for gathering one or more wrapped events into the program for execution by a computer.

14. The apparatus of claim 13, further comprising means for executing the program.

15. The apparatus of claim 13, wherein the program comprises a send function for routing messages to the wrapped events.

16. The apparatus of claim 12, wherein the defining means further comprises means for modifying an event for an object, wherein the modified event comprises one or more modified transitions.

17. The apparatus of claim 16, wherein the generating means further comprises:

means for translating the modified transitions to an execution language for execution by a computer, for wrapping the modified event, wherein the wrapped modified event comprises one or more translated transitions, transition selection logic, and state change logic corresponding to the modified event, and for gathering one or more wrapped modified events into the program for execution by a computer.

18. The apparatus of claim 12, wherein the transitions each comprise a condition and an action, wherein the action is executed when the condition is satisfied.

19. The apparatus of claim 11, wherein the object-oriented system comprises objects, wherein the defining means further comprises means for defining a method for an object, wherein the method comprises one or more instructions in a target programming language.

20. The apparatus of claim 19, wherein the generating means further comprises:

means for wrapping the method, wherein the wrapped method comprises one or more routines corresponding to an event; and means for gathering one or more wrapped methods into the program for execution by a computer.

21. An article of manufacture comprising a program storage medium readable by a computer having a memory, the medium tangibly embodying one or more programs of instructions executable by the computer to perform method steps for modeling object-oriented systems, the method comprising the steps of:

defining an object-oriented system stored in a computer; and generating a program external to the object-oriented system for execution by the computer, wherein the program contains the logic for implementing the behavior of objects in the object-oriented system and interfaces with the object-oriented system through one or more callback routines for retrieving information about objects in the object-oriented system and for performing updates to the object-oriented system.

22. The method of claim 21, wherein the object-oriented system comprises objects, wherein the defining step further comprises the step of defining an event for an object, wherein the event comprises one or more transitions.

23. The method of claim 22, wherein the generating step further comprises the steps of:

translating the transitions to an execution language for execution by a computer;

wrapping the event, wherein the wrapped event comprises one or more translated transitions, transition selection logic, and state change logic corresponding to the event; and gathering one or more wrapped events into the program for execution by a computer.

24. The method of claim 23, further comprising the step of executing the program.

25. The method of claim 22, wherein the defining step further comprises the step of modifying an event for an object, wherein the modified event comprises one or more modified transitions.

26. The method of claim 25, wherein the generating step further comprises the steps of:

translating the modified transitions to an execution language for execution by a computer;

wrapping the modified event, wherein the wrapped modified event comprises one or more translated transitions, transition selection logic, and state change logic corresponding to the modified event; and gathering one or more wrapped modified events into the program for execution by a computer.

27. The method of claim 22, wherein the transitions each comprise a condition and an action, wherein the action is executed when the condition is satisfied.

28. The method of claim 22, wherein the program comprises a send function for routing messages to the wrapped events.

29. The method of claim 21, wherein the object-oriented system comprises objects, wherein the defining step further comprises the step of defining a method for an object, wherein the method comprises one or more instructions in a target programming language.

30. The method of claim 29, wherein the generating step further comprises the steps of:

wrapping the method, wherein the wrapped method comprises one or more routines corresponding to an event; and gathering one or more wrapped methods into the program for execution by a computer.

\* \* \* \* \*